(12) United States Patent
Satou et al.

(10) Patent No.: US 10,747,197 B2
(45) Date of Patent: Aug. 18, 2020

(54) ABNORMALLY FACTOR IDENTIFICATION APPARATUS

(71) Applicant: FANUC CORPORATION, Yamanashi (JP)

(72) Inventors: Kazuhiro Satou, Yamanashi (JP); Yoshitaka Kubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/285,430

(22) Filed: Feb. 26, 2019

(65) Prior Publication Data

US 2019/0265673 A1    Aug. 29, 2019

(30) Foreign Application Priority Data

Feb. 27, 2018    (JP) .................................. 2018-033031

(51) Int. Cl.
   *G05B 19/406*     (2006.01)
   *G05B 19/4065*    (2006.01)
   *B23Q 17/09*      (2006.01)
   *B23Q 17/10*      (2006.01)
   *B23Q 17/00*      (2006.01)

(52) U.S. Cl.
   CPC ........... *G05B 19/406* (2013.01); *B23Q 17/09* (2013.01); *B23Q 17/0957* (2013.01); *B23Q 17/0971* (2013.01); *B23Q 17/0995* (2013.01); *B23Q 17/10* (2013.01); *G05B 19/4065* (2013.01); *B23Q 17/00* (2013.01); *G05B 2219/34455* (2013.01); *G05B 2219/34465* (2013.01);
   (Continued)

(58) Field of Classification Search
   CPC .............. G05B 19/406; G05B 19/4065; G05B 2219/34455; G05B 19/34465; G05B 19/37245; G05B 19/50276; B23Q 17/00; B23Q 17/09; B23Q 17/0957; B23Q 17/0971; B23Q 17/0995; B23Q 17/10
   See application file for complete search history.

(56) References Cited

U.S. PATENT DOCUMENTS

| 4,442,493 A | * | 4/1984 | Wakai ....................... G01N 3/58 |
| | | | 408/11 |
| 4,918,616 A | * | 4/1990 | Yoshimura ......... G05B 19/4065 |
| | | | 340/680 |

(Continued)

FOREIGN PATENT DOCUMENTS

| JP | H7-234987 A  | 9/1995 |
| JP | H10-228304 A | 8/1998 |

(Continued)

*Primary Examiner* — Andrew W Bee
(74) *Attorney, Agent, or Firm* — Hauptman Ham, LLP

(57) ABSTRACT

An abnormality factor identification apparatus includes a sensor signal obtaining unit that obtains sensor signals associated with the physical state of a machine, an operating state determination unit that determines operating states of the machine based on information obtained from the machine, an abnormality level calculation unit that calculates the abnormality levels of the sensor signals for each operating state of the machine determined by the operating state determination unit, and a factor identification unit that determines a factor in an abnormality in the machine from historical data being a series of the abnormality levels for each operating state.

3 Claims, 5 Drawing Sheets

(52) U.S. Cl.
CPC .............. *G05B 2219/37245* (2013.01); *G05B 2219/50276* (2013.01)

(56) References Cited

U.S. PATENT DOCUMENTS

| | | | | |
|---|---|---|---|---|
| 5,142,210 | A | * | 8/1992 | Kojima .............. G05B 19/4062 318/275 |
| 5,333,240 | A | * | 7/1994 | Matsumoto ............ G01H 1/003 706/20 |
| 6,508,614 | B1 | * | 1/2003 | Ozaki ...................... B23Q 1/38 310/90.5 |
| 2011/0063122 | A1 | | 3/2011 | Matsubara et al. |
| 2016/0091393 | A1 | * | 3/2016 | Liao ................... B23Q 17/0995 702/34 |
| 2017/0153023 | A1 | * | 6/2017 | Fujiwara ................ F01K 13/003 |
| 2017/0219420 | A1 | * | 8/2017 | Takahashi .............. G01H 17/00 |
| 2018/0354088 | A1 | | 12/2018 | Matsushita |
| 2018/0356282 | A1 | * | 12/2018 | Fukuda ................... G03G 15/55 |
| 2020/0059191 | A1 | * | 2/2020 | Inokuma ............. H02P 29/0241 |

FOREIGN PATENT DOCUMENTS

| | | |
|---|---|---|
| JP | 2011-60076 A | 3/2011 |
| JP | 2014191480 A | 10/2014 |
| JP | 2018005833 A | 1/2018 |
| JP | 2019079356 A | 5/2019 |
| WO | WO2017098658 A1 | 7/2018 |

\* cited by examiner

FIG. 3

| DETAILS OF CONTROL BY CONTROL UNIT | INFORMATION OBTAINED FROM MACHINE | MACHINE OPERATING STATES |
|---|---|---|
| NONE EXECUTED | — | STOPPED |
| EXECUTING RAPID FEED INSTRUCTION | — | AXIS DRIVING (NON-CUTTING) |
| BEFORE AND AFTER STARTING EXECUTION OF CUTTING FEED INSTRUCTION | — | AXIS DRIVING (START OF CUTTING) |
| EXECUTING CUTTING FEED INSTRUCTION | BEFORE AND AFTER STARTING CUTTING SIGNAL DETECTION | AXIS DRIVING (CUTTING) |
| — | CUTTING SIGNAL DETECTION | AXIS DRIVING (CUTTING) |
| BEFORE AND AFTER ENDING EXECUTION OF CUTTING FEED INSTRUCTION | — | AXIS DRIVING (END OF CUTTING) |
| — | BEFORE AND AFTER ENDING CUTTING SIGNAL DETECTION | AXIS DRIVING (END OF CUTTING) |
| — | AXIS ACCELERATING | AXIS DRIVING (ACCELERATING) |
| — | AXIS MOVING WITH CONSTANT VELOCITY | AXIS DRIVING (CONSTANT VELOCITY) |
| — | AXIS DECELERATING | AXIS DRIVING (DECELERATING) |
| FEED INSTRUCTION (DOWNWARD ALONG Z AXIS) | AXIS MOVING (DOWNWARD ALONG Z AXIS) | AXIS DRIVING (IN DIRECTION OF GRAVITATIONAL FORCE) |
| ⋮ | ⋮ | ⋮ |

FIG. 4
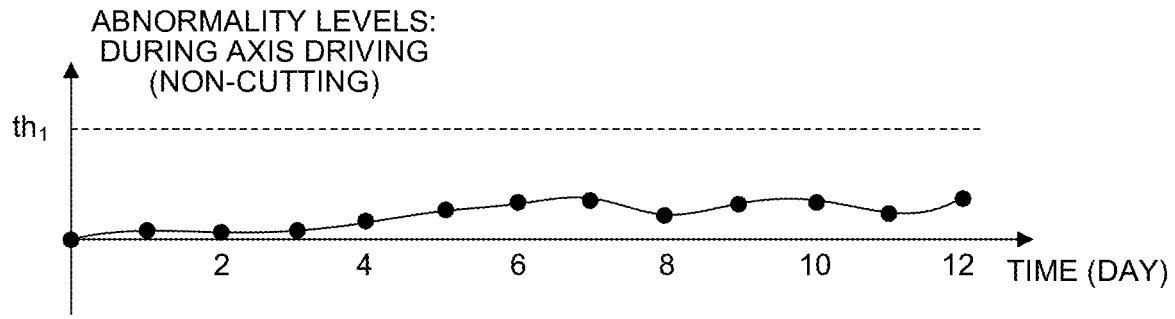
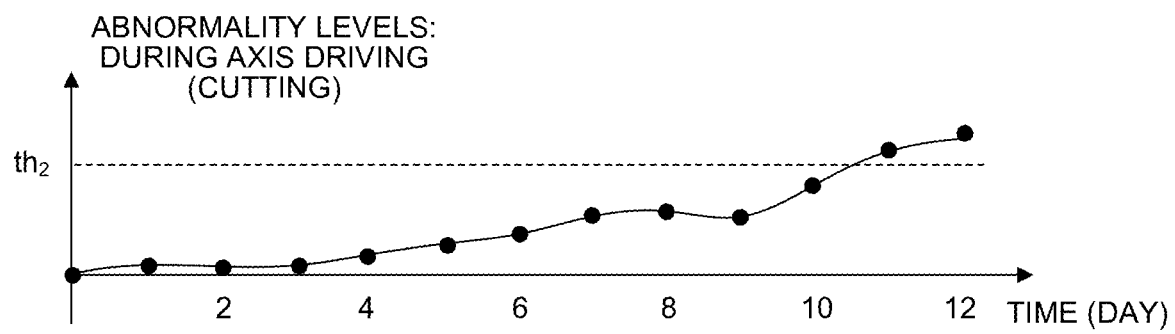
FIG. 5
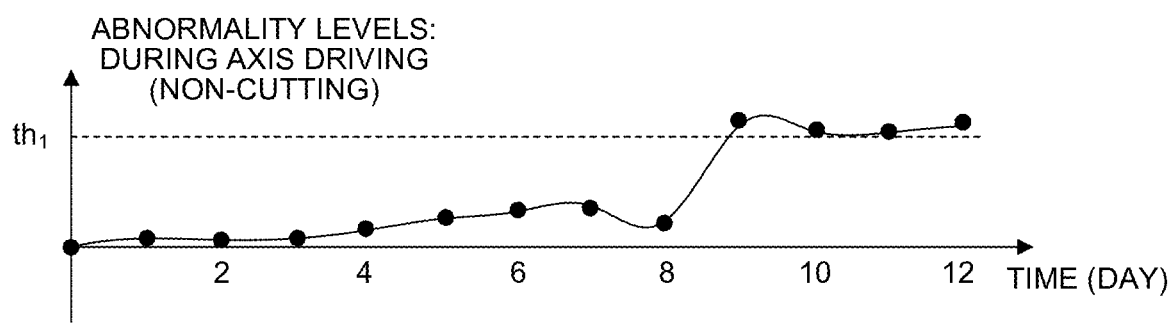
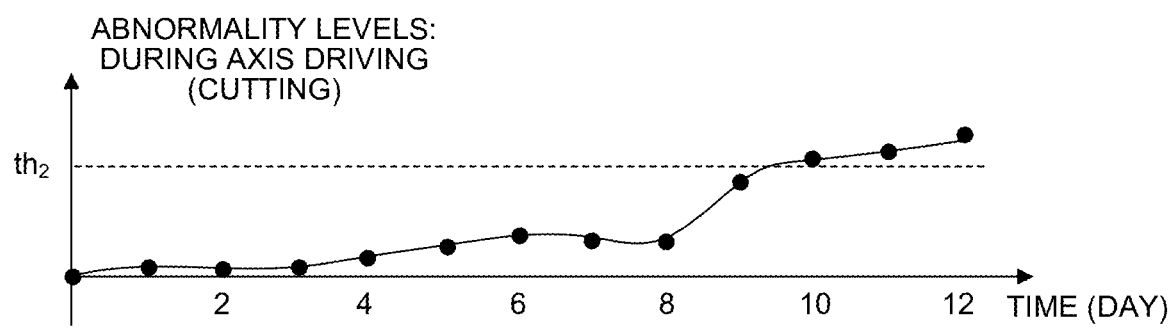

FIG. 6

ABNORMALITY FACTOR IDENTIFICATION TABLE

| RULE FOR IDENTIFYING ABNORMALITY FACTOR | ABNORMALITY SITE, ABNORMALITY TYPE |
|---|---|
| ABNORMALITY LEVEL DURING AXIS MOVING (NON-CUTTING) < $th_1$<br>ABNORMALITY LEVEL DURING AXIS MOVING (CUTTING) > $th_2$<br>ABNORMALITY LEVEL CHANGE: SLOW | ABNORMALITY SITE: TOOL<br>ABNORMALITY TYPE: WEAR |
| ABNORMALITY LEVEL DURING AXIS MOVING (NON-CUTTING) < $th_1$<br>ABNORMALITY LEVEL DURING AXIS MOVING (CUTTING) > $th_2$<br>ABNORMALITY LEVEL CHANGE: SHARP | ABNORMALITY SITE: TOOL<br>ABNORMALITY TYPE: BREAKAGE |
| ABNORMALITY LEVEL DURING AXIS MOVING (NON-CUTTING) < $th_1$<br>ABNORMALITY LEVEL DURING AXIS MOVING (CUTTING) > $th_2$<br>ABNORMALITY LEVEL CHANGE: SLOW | ABNORMALITY SITE: SPINDLE<br>ABNORMALITY TYPE: WEAR ON BEARING |
| ⋮ | ⋮ |

ABNORMALLY FACTOR IDENTIFICATION APPARATUS

RELATED APPLICATION

The present application claims priority to Japanese Application Number 2018-033031 filed Feb. 27, 2018, the disclosure of which is hereby incorporated by reference herein in its entirety.

BACKGROUND OF THE INVENTION

1. Field of the Invention

The present invention relates to an abnormality factor identification apparatus, and particularly, to an abnormality factor identification apparatus that isolates an abnormality factor based on a symptom of a fault.

2. Description of the Related Art

To sense or predict an abnormality including a fault in an industrial machine such as a machine tool or a robot, typically, a sensor that differently responds depending on the abnormality factor (e.g., a fault type or a fault site) is installed near a target site, and a detection value from the sensor is used to sense or predict an abnormality. However, it is difficult to install a sensor in a manner to selectively respond to only a specific abnormality. Such a sensor may often respond to an abnormality associated with another factor. Thus, there is a need for isolating an abnormality factor.

Conventional techniques have been known to isolate an abnormality factor in a machine using detection values from sensors. For example, Japanese Patent Laid-Open No. 2011-060076 discloses a technique that determines the state of an abnormality based on signals from a number of sensors and internal information from a numerically controlled apparatus to identify the cause of alarm sounding, and outputs indication and a control signal. Japanese Patent Laid-Open No. 10-228304 also discloses a technique that modifies the drive and mechanism model to improve the accuracy of abnormality sensing for abnormality determination that responds to changes in characteristics of a processing apparatus. In addition, Japanese Patent Laid-Open No. 07-234987 discloses a technique that, for ease of a diagnosis of a fault in a numerically controlled apparatus, displays presumed causes at the fault site, and the like, and changes the presumed cause probability database for each occurrence of a fault.

An abnormality factor may be isolated by, as disclosed in Japanese Patent Laid-Open No. 2011-060076, installing a sensor for each site of an industrial machine and identifying the abnormality factor based on the strength of the sensor responding. However, the minimum possible number of sensors are desirably installed for cost savings and ease of maintenance.

If details of a phenomenon occurring for each abnormality factor are known in advance, as disclosed in Japanese Patent Laid-Open No. 07-234987, the preliminary knowledge can be used to isolate an abnormality factor. Generally speaking, however, a fault rarely occurs in an industrial machine, and it is often difficult to gather knowledge about a machine abnormality caused by a fault. Furthermore, sensor observation values may often be significantly influenced by the machine installation environment and the individual difference. Any prepared preliminary knowledge often has to be modified for use depending on the sensor installation environment and the individual difference. Thus, it is desirable to use no preliminary knowledge about sensor observation values.

SUMMARY OF THE INVENTION

An object of the present invention is to provide an abnormality factor identification apparatus that isolates an abnormality factor based on a symptom of an abnormality.

An abnormality factor identification apparatus according to the present invention solves the above problems by isolating an abnormality factor using a combination of information about operating states of the machine and sensor signals. The abnormality factor identification apparatus of the present invention calculates operational abnormality levels based on sensor signals in multiple different operating states of the machine, produces historical data indicating the time-series profiles of the abnormality levels, and stores the historical data in association with the machine operating states. Then, the profiles of the abnormality levels in the multiple operating states of the machine are analyzed to isolate an abnormality factor.

One aspect of the present invention is an abnormality factor identification apparatus for identifying a factor in an abnormality occurring in a machine. The abnormality factor identification apparatus includes a sensor signal obtaining unit that obtains sensor signals associated with the physical state of the machine, an operating state determination unit that determines operating states of the machine based on information obtained from the machine, an abnormality level calculation unit that calculates the abnormality levels of the sensor signals for each operating state of the machine determined by the operating state determination unit, and a factor identification unit that determines a factor in an abnormality in the machine from historical data being a series of the abnormality levels for each operating state.

The present invention achieves an abnormality factor isolation with accuracy higher than the conventional methods. In particular, the invention enables an abnormality factor to be isolated with a certain degree of accuracy maintained even in an environment with a small number of sensor values.

BRIEF DESCRIPTION OF THE DRAWINGS

The above and other objects and features of the present invention will be apparent from the embodiment described later with reference to the accompanying drawings, wherein:

FIG. 3 illustrates an operating state determination table;

FIG. 4 illustrates historical data on the abnormality levels of motor velocity feedback values for each machine operating state in the event of tool wear;

FIG. 5 illustrates historical data on the abnormality levels of motor velocity feedback values for each machine operating state in the event of spindle failure; and FIG. 6 illustrates an abnormality factor identification table.

DETAILED DESCRIPTION OF THE PREFERRED EMBODIMENTS

An embodiment of the present invention will now be described in connection with the drawings.

Figure 1:
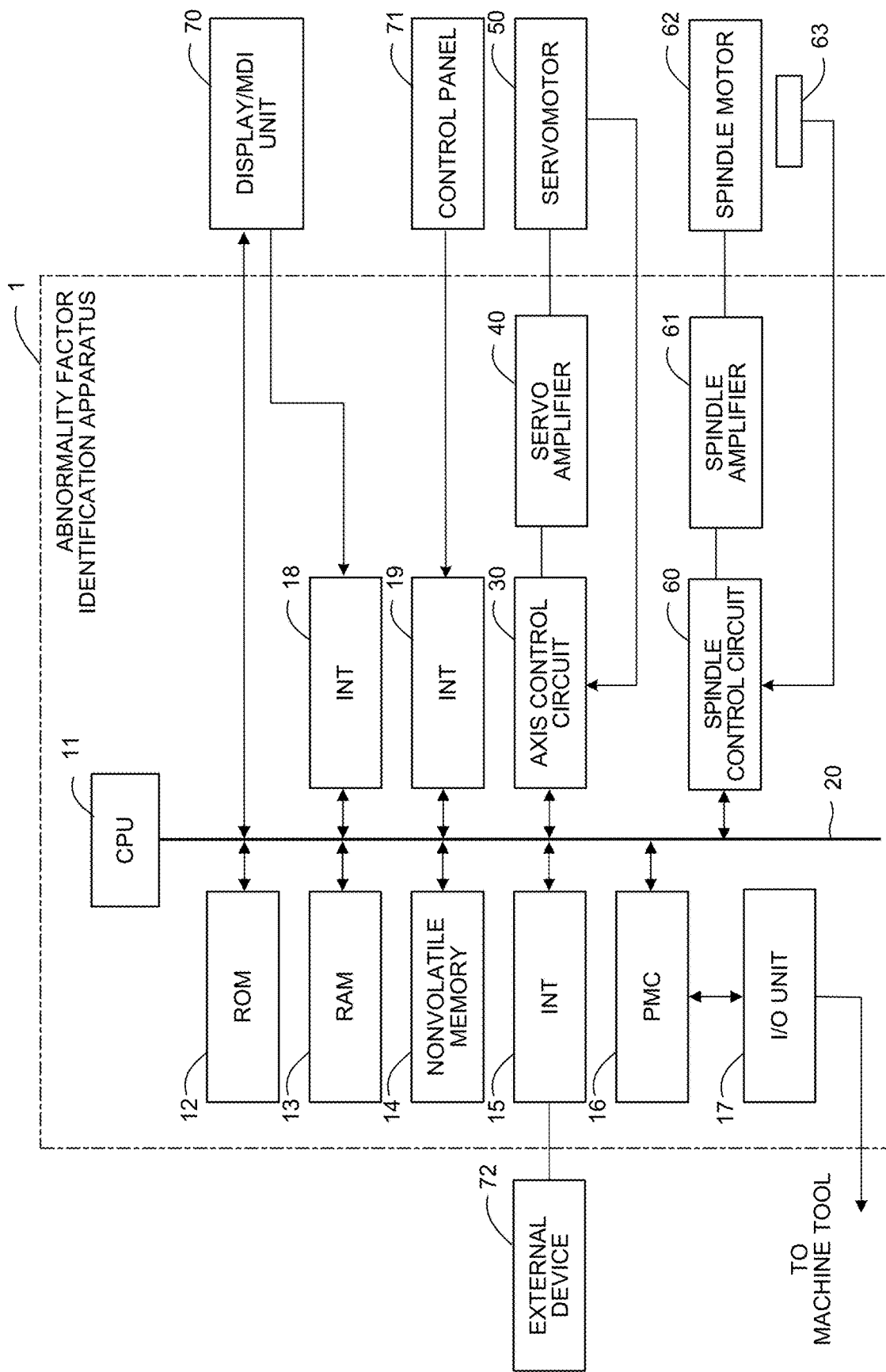
FIG. 1 is a schematic hardware block diagram of an abnormality factor identification apparatus according to a first embodiment.

FIG. 1 is a schematic hardware block diagram illustrating a main part of an abnormality factor identification apparatus according to an embodiment of the present invention. The abnormality factor identification apparatus 1 may be implemented as a controller for machines such as a robot and a machine tool. The abnormality factor identification apparatus 1 may also be implemented as a computer such as a personal computer installed next to a controller for machines, or a cell computer, a host computer, or a cloud server connected to the controller via a network. FIG. 1 illustrates the abnormality factor identification apparatus 1 implemented as a controller for machines.

The abnormality factor identification apparatus 1 of the present embodiment includes a CPU 11, which is a processor for controlling the overall abnormality factor identification apparatus 1. The CPU 11 reads a system program from a ROM 12 via a bus 20 and controls the overall abnormality factor identification apparatus 1 in accordance with the system program. A RAM 13 temporarily stores temporary calculation data, display data, and various kinds of data entered by an operator via an input unit (not shown).

A nonvolatile memory 14 is backed up by, for example, a battery (not shown) and thus retains data even after the abnormality factor identification apparatus 1 is turned off.

The nonvolatile memory 14 stores a control program read from an external device 72 via an interface 15, a control program entered via a display/MDI unit 70, and various kinds of data obtained from each component of the abnormality factor identification apparatus 1, a machine tool, a sensor, and the like (e.g., various signals indicating the execution state of an instruction provided by a control program and the operating state of a machine tool, the positions, velocities, and current-voltage values of a servomotor 50 and a spindle motor 62, detection values from sensors such as a vibration sensor and a temperature sensor, processing conditions, tool and workpiece information). The control programs and the various kinds of data stored in the nonvolatile memory 14 may be loaded into the RAM 13 for execution or use. The ROM 12 stores a known analysis program and other various system programs preliminarily written in it.

The interface 15 is an interface to connect the abnormality factor identification apparatus 1 and the external device 72 such as an adaptor. The abnormality factor identification apparatus 1 reads programs and various parameters from the external device 72. The abnormality factor identification apparatus 1 may also edit and store programs and various parameters into external storage via the external device 72. A PMC (programmable machine controller) 16 outputs signals to a machine tool and peripheral devices for the machine tool (e.g., an actuator such as a robot hand for tool replacement, a sensor installed in a machine tool) via an I/O unit 17 and controls them in accordance with a sequence program stored in the abnormality factor identification apparatus 1. The PMC 16 also receives signals from various switches on the control panel for the main body of the machine tool and from the peripheral devices, processes the signals as appropriate, and passes the resulting signals to the CPU 11.

The display/MDI unit 70 is a manual data input device including a display and a keyboard, and an interface 18 receives an instruction and data from the keyboard of the display/MDI unit 70 and passes them to the CPU 11. An interface 19 is connected to a control panel 71 including a manual pulse generator used to manually drive each axis.

An axis control circuit 30 for controlling an axis included in a machine tool receives an axis movement distance instruction from the CPU 11 and outputs the instruction for the axis to a servo amplifier 40. The servo amplifier 40 receives the instruction to drive the servomotor 50 that moves the machine tool axis. The servomotor 50 for the axis includes a position and velocity detector and controls the position and the velocity of the axis by feeding position and velocity feedback signals from the position and velocity detector back to the axis control circuit 30.

The hardware block diagram of FIG. 1 shows the single axis control circuit 30, the single servo amplifier 40, and the single servomotor 50. However, each of the numbers of provided axis control circuits 30, servo amplifiers 40, and servomotors 50 is actually equal to the number of machine tool axes to be controlled.

A spindle control circuit 60 receives a spindle rotation instruction and outputs a spindle velocity signal to a spindle amplifier 61. The spindle amplifier 61 receives the spindle velocity signal and rotates the spindle motor 62 of the machine tool at the specified rotational velocity to drive the tool. The spindle motor 62 is coupled with a position coder 63. The position coder 63 outputs feedback pulses in synchronization with the spindle rotation, and the feedback pulses are read by the CPU 11.

Figure 2:
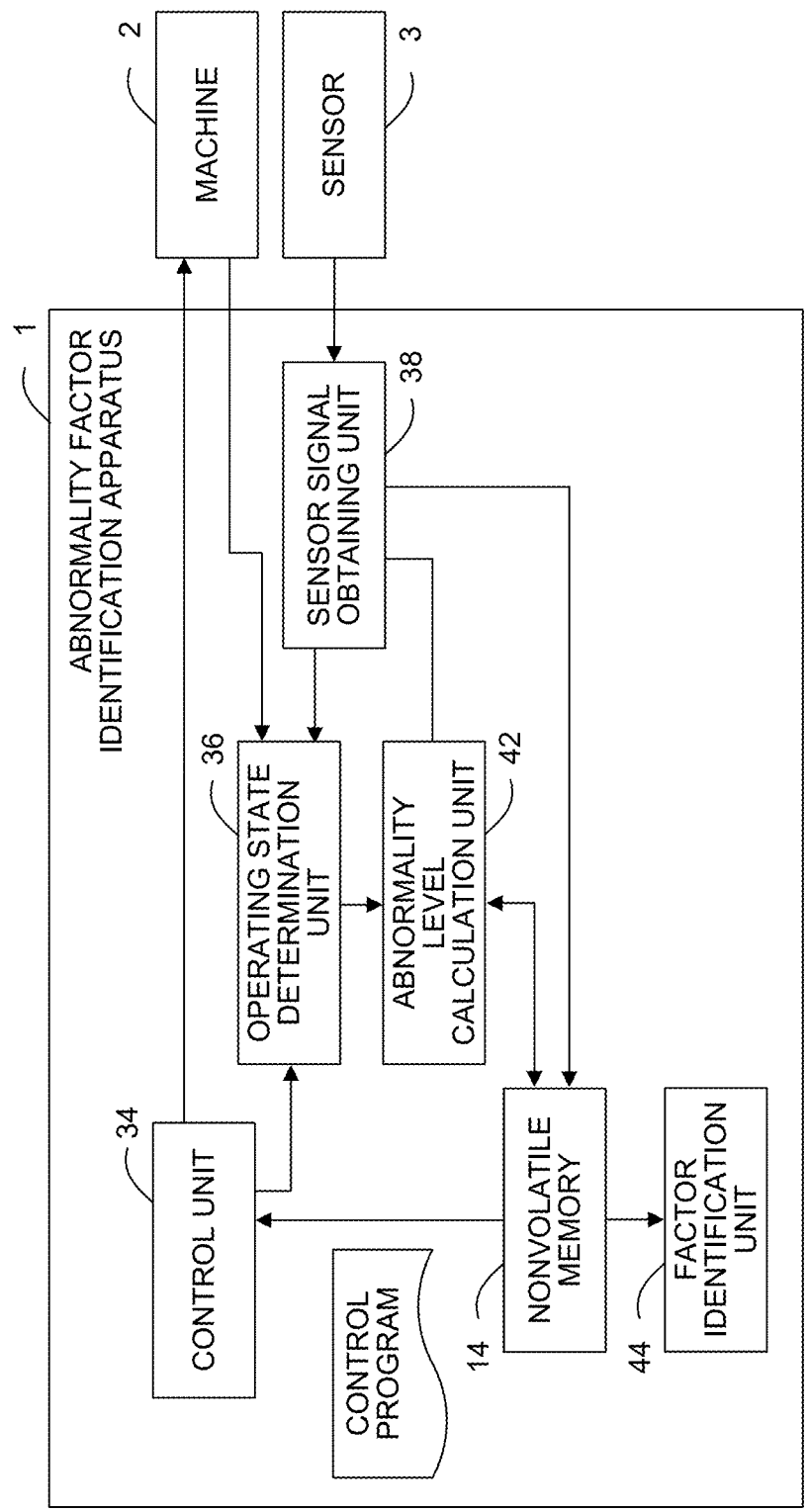
FIG. 2 is a schematic functional block diagram of the abnormality factor identification apparatus according to the first embodiment.

FIG. 2 is a schematic functional block diagram of the abnormality factor identification apparatus 1 according to the first embodiment.

Each functional block shown in FIG. 2 is implemented when the CPU 11 included in the abnormality factor identification apparatus 1 in FIG. 1 executes each system program and controls the operation of each component of the abnormality factor identification apparatus 1.

The abnormality factor identification apparatus 1 in the present embodiment includes a control unit 34 that controls a machine 2 based on a control program read from the nonvolatile memory 14, an operating state determination unit 36 that determines the operating state of the machine 2 based on information obtained from the control unit 34 and the machine 2, a sensor signal obtaining unit 38 that obtains a detection value from a sensor 3 for the machine as a sensor signal, an abnormality level calculation unit 42 that calculates operational abnormality levels of the machine 2 based on the machine operating state determined by the operating state determination unit 36 and the sensor signal obtained by the sensor signal obtaining unit 38 from the sensor 3 and stores the calculated operational abnormality levels into the nonvolatile memory 14 as historical data associated with the operating state of the machine 2, and a factor identification unit 44 that detects an abnormality in the machine 2 and identifies the abnormality factor based on the historical data about the operational abnormality levels of the machine 2, stored in the nonvolatile memory 14.

The control unit 34 is a functional unit that reads a control program block from the nonvolatile memory 14 and controls the machine 2 based on the instruction from the block. The control unit 34 has typical functions for controlling each component of the machine 2. In one example, when the control program block issues an instruction to move an axis included in the machine 2, the control unit 34 outputs a movement distance for each control cycle to the servomotor 50 that drives the axis. In another example, when the control program block issues an instruction to operate a peripheral device (not shown) attached to the machine 2, the control unit 34 outputs an operational instruction to the peripheral device. In addition, when the factor identification unit 44 detects an abnormality, the control unit 34 operates in a manner to cope with the abnormality. For example, the control unit 34 displays a warning on the display/MDI unit and stops the current operation of the machine 2 based on the abnormality factor identified by the factor identification unit 44.

The operating state determination unit 364 is a functional unit that determines the operating state of the machine 2 based on details of the control by the control unit 34 for the machine 2 and information obtained from the machine 2. For example, while the control unit 34 is executing a rapid feed instruction, the operating state determination unit 36 determines that the servomotor 50 included in the machine 2 is driving. While the control unit 34 is executing a cutting feed instruction, the operating state determination unit 36 determines that the machine 2 is cutting while driving the servomotor 50. Furthermore, for example, when the operating state determination unit 36 senses a signal from the machine 2 indicating that cutting feed is being performed, the operating state determination unit 36 may determine that the machine 2 is cutting while driving the servomotor 50. In addition, the operating state determination unit 36 may sense an operational signal from a peripheral device included in the machine 2 to determine that the peripheral device is operating. In this manner, the operating state determination unit 36 may comprehensively determine the operating state of the machine 2 based on the information about the control of the control unit 34, the information obtained from the machine 2, and an optional sensor signal obtained by the sensor signal obtaining unit 38 from the sensor 3. This enables the operating state of the machine 2 to be effectively determined. The operating state determination unit 36 may also determine multiple operating states of the machine 2 that may be concurrent with each other, such as axis driving and accelerating, and axis driving and decelerating.

The operating state determination unit 36 may also determine the operating state of the machine 2 using a machine operating state determination table, for example, illustrated in FIG. 3. The machine operating state determination table of FIG. 3 associates the machine operating states with details of the control by the control unit 34 and information obtained from the machine. In the machine operating state determination table of FIG. 3, the sign "-" may denote any item. The preliminary creation of the table associating the machine operating states with details of the control by the control unit 34 and information obtained from the machine allows the operating state determination unit 36 to quickly determine the current operating state of the machine 2. In addition to the example in FIG. 3, for example, a function may be created in advance and used for determining the machine operating state using, as arguments, details of the control by the control unit 34 (e.g., instructions, coordinates) and information obtained from the machine. In some cases, a machine learner may be used that receives details of the control by the control unit 34 (e.g., instructions, coordinates) and information obtained from the machine and outputs the operating state of the machine 2. The operating state determination unit 36 may be implemented in any manner that enables the operating state of the current machine 2 to be determined accurately and quickly.

The sensor signal obtaining unit 38 is a functional unit that obtains, as a sensor signal, a detection value detected by the sensor 3 attached to the machine 2. Examples of the sensor 3 from which the sensor signal obtaining unit 38 obtains detection values may include a position and velocity detector and the position coder 63 attached to the servomotor 50 and the spindle motor 62, a temperature sensor that measures the temperature in the machine 2, an acceleration sensor that detects vibrations in the machine 2, and a sound sensor that detects a sound produced by the machine 2.

Although the sensor signal obtaining unit 38 may be configured to obtain sensor signals from multiple sensors 3, the minimum possible number of sensors 3 may be desirably installed for cost savings and ease of maintenance. If the abnormality factor identification apparatus 1 of the present invention obtains sensor signals from a few or even a single sensor 3, the abnormality factor isolation method implemented by the abnormality factor identification apparatus 1 enables an abnormality factor to be isolated with reasonable accuracy. Although a fewer sensors 3 provide the reduced accuracy of identifying the abnormality factor, the reduction is sufficiently compensated using the operating state information about the machine 2 determined by the operating state determination unit 36.

The sensor signals obtained by the sensor signal obtaining unit 38 may be instantaneous detection values or time-series detection values sequentially obtained in the same operating state of the machine 2. However, time-series detection values are desirably obtained in the same operating state of the machine 2 because the abnormality level calculation unit 42 may use changes in detection values detected by the sensor 3 and an abnormality level may be calculated by a statistical method. The sensor signal obtaining unit 38 may obtain sensor signals during normal operation of the machine 2 or, for example, a predetermined trial operation may be performed before the start of daily operation of the machine 2 and the sensor signals may be obtained during the trial operation.

The sensor signal obtaining unit 38 obtains sensor signals for each operating state of the machine 2, and may store the obtained signals into the nonvolatile memory 14 as reference sensor signals in association with the operating state based on an operation instruction from an operator via the display/MDI unit 70. The reference sensor signals stored in the nonvolatile memory 14 are used by the abnormality level calculation unit 42 as references for calculating an operational abnormality level of the machine 2. Thus, the reference sensor signals are desirably obtained when the machine 2 normally operates. The nonvolatile memory 14 may store data sufficiently for the abnormality level calculation unit 42 to statistically process sensor signals associated with the same operating state. The installation and operation environments for the machine 2 may affect the detection values detected by the sensor 3. To address this issue, in actually the machine 2 may be operated as a trial at early stages after the machine 2 is installed in an environment for actual operation. During the trial, reference data of sensor signals may be obtained in the multiple operating states, and the obtained reference sensor signals may be stored in the nonvolatile memory 14 in association with each operating state.

The abnormality level calculation unit 42 is a functional unit that, based on the sensor signals obtained by the sensor signal obtaining unit 38, calculates operational abnormality levels of the machine 2 for each operating state determined by the operating state determination unit 36, and stores the historical data of the calculated operational abnormality levels of the machine 2 for each operating state into the nonvolatile memory 14. The abnormality level calculation unit 42 may, for example, use a predetermined function to calculate degrees of deviation of the obtained sensor signal data from the reference sensor signal data (set) for each operating state stored in the nonvolatile memory 14, and use the calculated degrees as abnormality levels. In this case, for example, known techniques may be used such as a common test for outliers, the K-nearest neighbor algorithm, and the MT system. The historical data stored by the abnormality level calculation unit 42 into the nonvolatile memory 14 indicates the time series of the calculated abnormality levels. For example, each of the operational abnormality levels of the machine 2 for each operating state included in the historical data may include the information indicating the calculation order of the abnormality levels and also include the obtaining times of the sensor signals based on which the abnormality levels are calculated.

The factor identification unit 44 is a functional unit that detects an abnormality in the machine 2 and identifies the abnormality factor based on the historical data on the operational abnormality levels of the machine 2 stored in the nonvolatile memory 14. The factor identification unit 44 analyzes the time-series profile of the abnormality levels of the historical data for each operating state of the machine 2, and isolates an abnormality factor (the abnormality site, the abnormality type) based on the resultant profile of the abnormality levels for each operating state. The factor identification unit 44 may, for example, determine the rate of change in the abnormality levels of the historical data for each of the multiple operating states of the machine 2, and isolate an abnormality factor based on the abnormality level values and the rate of abnormality level change for each operating state.

FIGS. 4 and 5 each illustrate an example of the historical data of the abnormality levels of motor velocity feedback values in the operation of the machine 2, for the corresponding operating state of the machine 2, stored in the nonvolatile memory 14. In FIGS. 4 and 5, $th_1$ and $th_2$ each denote a threshold of abnormality levels for determining that the operation of the machine 2 in the corresponding operating state indicates an abnormality symptom. For ease of illustration, FIGS. 4 and 5 simply show the historical data of abnormality levels associated with the operating states of the machine 2 that are axis driving (non-cutting) and axis driving (cutting). However, the nonvolatile memory 14 actually stores the historical data of abnormality levels in association with many operating states.

In the example shown in FIG. 4, the operating state of the machine 2 that is axis driving (non-cutting) indicates no significant changes in the abnormality levels. In contrast, the operating state of the machine 2 that is axis driving (cutting) indicates an abnormality symptom (exceeding the threshold $th_2$) in the abnormality levels, and the abnormality level has slowly increased for four days until the isolation of an abnormality factor. Such a case allows the identification of an abnormality such as wear occurring on a tool.

In the example shown in FIG. 5, both the abnormality levels in the operating states of the machine 2 that are axis driving (non-cutting) and axis driving (cutting) indicate abnormality symptoms (exceeding the thresholds $th_1$ and $th_2$), and the abnormality level sharply increased four days before the isolation of an abnormality factor. Such a case allows the identification of an abnormality such as a failure occurring in the spindle mechanism (e.g., a bearing for the spindle motor 62).

Such an abnormality associated with the spindle may also be identified based on sensor signals detected by an acceleration sensor (spindle vibrations), a temperature sensor (spindle temperature), and a sound sensor (spindle vibrations and unusual sound).

In addition, abnormality factors may be identified based on various machine operating states. For example, if the machine 2 is a machine tool, a spindle or a table support may have an abnormality factor in the case that the abnormality level in the operating state that is axis driving (start of cutting) suddenly increases and the abnormality level in other operating states does not increase too much. If the machine 2 is a robot, a decelerator for a joint of the robot is highly likely to have an abnormality factor in the case of a day-by-day slow increase in the abnormality level calculated in the operating state of raising a robot arm (axis driving: in the direction opposite to the gravitational force) and a sharp increase in the abnormality level calculated in the operating state of lowering the robot arm (axis driving: in the direction of the gravitational force). In this manner, an abnormality factor may be identified based on changes in the abnormality levels in various operating states of the machine 2.

For the simplest identification of an abnormality factor, the factor identification unit 44 may perform the identification processing illustrated in FIGS. 4 and 5 based on, for example, a table or a rule provided by the maker of the machine 2. In this case, an abnormality factor identification table, for example, illustrated in FIG. 6 may be created and stored in the nonvolatile memory 14. The factor identification unit 44 may use the abnormality factor identification table to determine the abnormality site and the abnormality type. The profile of the historical data on the abnormality levels for each operating state of the machine 2 is defined by not directly using the sensor signals but referring to the abnormality levels, which are round parameters. Thus, machines 2 of the same type will provide similar profiles, and an abnormality factor identification table provided by the maker can be directly used without problems. In some cases, after the machine 2 is installed at a site for operation, a parameter (e.g., a threshold) for a rule included in an abnormality factor identification table for identifying an abnormality factor may be modified based on sensor signals obtained for each operating state. This modification can adapt the parameter to the characteristics of the machine 2 installed at the site and to the installation environment.

In addition, the factor identification unit 44 may include a machine learner, which may be used to identify the abnormality site and the abnormality type based on the historical data of abnormality levels. In this case, the machine learner may be caused to, for example, perform machine learning based on the abnormality factors in abnormalities of the machine 2 (or a machine of the same type) that occurred (and were dealt with) in the past and the historical data of the abnormality levels stored in the nonvolatile memory 14 at these times. On the basis of the learning results, an abnormality factor may be identified by causing the machine learner to identify the abnormality site and the abnormality type based on the historical data of the abnormality levels. Although the introduction of a machine learner involves difficulty due to a costly learning process, the machine learning is advantageous because of its flexible adaptation to the characteristics of the machine 2 and the installation environment.

Additionally, the maker of the machine 2 may prepare a general-purpose learning model by causing a machine of the same type to perform machine learning. After the machine 2 is installed in a factory for operation, and the like, the machine 2 may be caused to perform additional machine learning using the general-purpose learning model to produce a derived model. The use of the derived model can reduce the learning costs to some degree.

Although an embodiment of the present invention has been described, the present invention is not limited to the above embodiment and may be modified as appropriate into other aspects.

The invention claimed is:

1. An abnormality factor identification apparatus for identifying a factor in an abnormality occurring in a machine, the apparatus comprising:

a processor configured to
  obtain sensor signals associated with a physical state of the machine,
  determine operating states of the machine based on information obtained from the machine,
  calculate abnormality levels of the sensor signals for each determined operating state of the machine, and
  determine a factor in an abnormality in the machine from historical data being a series of the abnormality levels for said each determined operating state.

2. The abnormality factor identification apparatus according to claim 1, wherein the processor is configured to calculate the abnormality levels of the sensor signals for each operating state using sensor signals stored in a normal condition.

3. The abnormality factor identification apparatus according to claim 1, wherein
  the processor is configured to
    obtain information associated with velocity feedback on a spindle motor for driving a spindle of the machine or a value from an acceleration sensor installed on the spindle,
    determine an operating state being cutting or non-cutting, and
    determine an abnormality in a spindle portion when an abnormality level during cutting and an abnormality level during non-cutting both increase at around the same time, and identifies an abnormality in a tool when merely an abnormality level during cutting increases.

* * * * *